United States Patent [19]

Nomura et al.

[11] Patent Number: 4,548,093
[45] Date of Patent: Oct. 22, 1985

[54] INTERMEDIATE-LEVER DEVICE FOR A PARKING BRAKE SYSTEM

[75] Inventors: Yoshihisa Nomura; Masayoshi Katagiri; Shigemi Sakakibara, all of Toyota, Japan

[73] Assignee: Toyota Jidosha Kabushiki Kaisha, Aichi, Japan

[21] Appl. No.: 614,758

[22] Filed: May 29, 1984

[30] Foreign Application Priority Data

Jun. 8, 1983 [JP] Japan ................. 58-102299

[51] Int. Cl.[4] ........................... G05G 1/14; F16C 1/10
[52] U.S. Cl. ................... 74/512; 74/501 R; 312/235 R; 296/37.8; 180/315
[58] Field of Search ............. 74/501 R, 512; 108/44; 312/235 R, 235 A; 296/37.8; 180/315

[56] References Cited

U.S. PATENT DOCUMENTS

| | | | |
|---|---|---|---|
| 1,441,052 | 1/1923 | Alborn | 180/315 |
| 2,724,982 | 11/1955 | Sanft | 74/501 |
| 2,853,144 | 9/1958 | Mench | 180/315 |
| 3,177,033 | 4/1965 | Daniels | 296/37.8 |
| 4,086,824 | 5/1978 | Johnson | 74/512 |
| 4,412,458 | 11/1983 | Derringer | 74/512 |

Primary Examiner—Kenneth J. Dorner
Attorney, Agent, or Firm—Parkhurst & Oliff

[57] ABSTRACT

An intermediate-lever device for a vehicle parking brake system including a first brake cable connected to a hand- or foot-operated control member, and a second brake cable connected to a parking brake mechanism on a vehicle wheel. The device comprises an intermediate lever connecting the first brake cable to the second brake cable, and a bracket pivotally supporting the intermediate lever. The intermediate lever and the bracket are accommodated in a console box disposed between right and left seats of a vehicle, and the bracket is secured to an upper surface of a floor panel of the vehicle with which the seats are associated.

19 Claims, 3 Drawing Figures

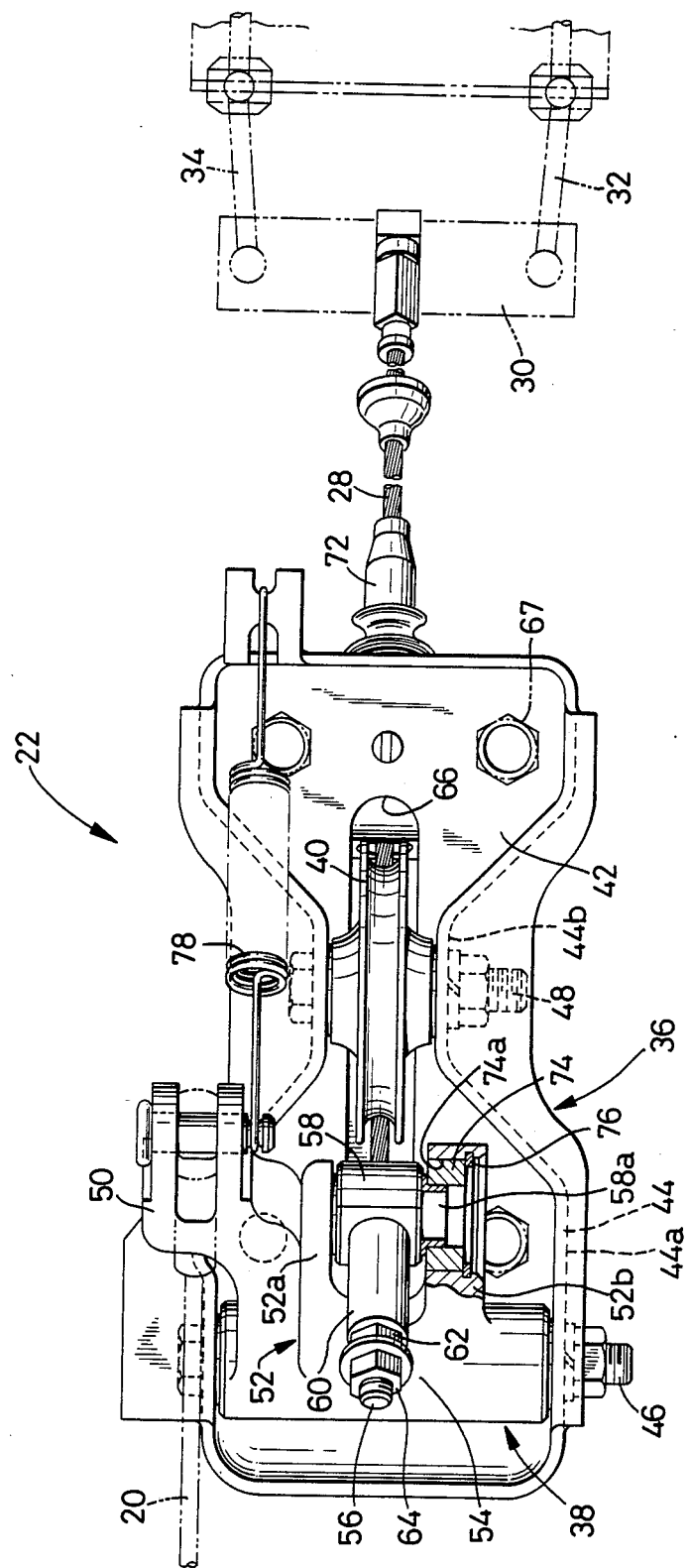

INTERMEDIATE-LEVER DEVICE FOR A PARKING BRAKE SYSTEM

BACKGROUND OF THE INVENTION

The present invention relates to an intermediate-lever device in a parking brake system, for connecting brake cables to transmit a brake actuation force to a parking brake.

An intermediate-lever device including an intermediate lever is provided to couple a brake cable connected to a control member (such as a foot or hand lever), to another brake cable connected to a parking brake mechanism for applying a parking brake to a wheel of a vehicle. Such an intermediate-lever device is used particularly in a parking brake system wherein the control member is a foot-operated pedal lever.

A traditional intermediate-lever device is disposed on the lower side of a floor panel of a vehicle. This location of the device inherently renders the device as well as brake cables connected thereto subject to muddy water and other foreign matter, which will cause or promote development of rust on the device and the cables, resulting in the intermediate lever being prevented from operating in a smooth manner, and further leading to reduction in durability or service life of the cables. In the meantime, the intermediate-lever device is commonly equipped with a cable adjusting mechanism for adjusting a tension of the brake cable connected to the intermediate lever. In this instance, the adjusting mechanism is also located under the floor panel of the vehicle. This location makes it relatively difficult to gain access to the adjusting mechanism for tension adjustment of the cable. In many cases, the intermediate-lever device is disposed in a tunnel formed on the lower surface of the floor panel of a vehicle, i.e., disposed in an elongate recess formed in a vehicle body along its length from the front towards the rear. On a front-engine/front-drive vehicle (hereinafter referred to as an F—F car), however, such a tunnel is made smaller in size. As a result, the F—F car encounters a difficulty in installing the intermediate-lever device in the tunnel. This problem associated with the intermediate-lever device is inherent in an F—F car.

SUMMARY OF THE INVENTION

It is therefore an object of the present invention to provide an intermediate-lever device for a parking brake system, which is protected and adapted to protect brake cables connected thereto against muddy water, dirt or other foreign matter.

Another object of the invention is to provide such an intermediate-lever device which has a cable adjusting mechanism which is readily accessible for tension adjustment of a cable.

A further object of the invention is the provision of such an intermediate-lever device which is easily adaptable to a parking brake system in a front-engine/front-drive vehicle.

According to the present invention, there is provided an intermediate-lever device for a parking brake system in a vehicle which has a console box disposed between right and left seats thereof associated with an upper surface of a floor panel thereof. The parking brake system includes a parking brake control member, a parking brake mechanism, a first brake cable connected at its one end to the control member, and a second brake cable connected at its one end to the parking brake mechanism. The instant intermediate-lever device comprises an intermediate lever connecting the other end of the first brake cable to the other end of the second brake cable, and a bracket pivotally supporting the intermediate lever. The intermediate lever and the bracket are accommodated in the console box, and the bracket is secured to the upper surface of the floor panel.

With the above arrangement wherein the intermediate-lever device is located on the floor panel, the device is protected against muddy water or other foreign substances which might prevent smooth reliable operation of the intermediate lever. Further, the brake cables, intermediate lever, bracket and other components of the intermediate-lever device are protected against corrosion thereof due to otherwise possible exposure to such foreign matter, whereby their durability or service life is improved. Since the console box of the vehicle houses or covers the intermediate-lever device, there is no possibility that the intermediate-lever device otherwise directly exposed to a passenger's compartment or room may impair the interior appearance of the compartment or injure a passenger due to contact with a component of the device.

As a further advantage, the intermediate-lever device of the invention occupies no space on the side of the lower surace of the floor panel of a vehicle. This aspect is significant particularly when the invention is applied to a parking brake system in a front-engine/front-drive vehicle.

In a traditional parking brake system wherein a hand-operated control lever or handle is provided, the control lever is required to extend through a vehicle console box such that the lever can be pivoted with a portion thereof moving in a space of the console box. This movement of the hand-operated control lever is undesired for effective space utilization of the console box. In accordance with an advantageous form of the invention, the intermediate-lever device is connected to a foot-operated type of control member. In this case, the intermediate-lever device has no parts which extend above the console box and consequently permits a full utilization of space of the console box.

According to another advantageous aspect of the invention, the intermediate-lever device includes a cable adjusting mechanism which is disposed above the upper surface of the floor panel and between the intermediate lever and the second brake cable connected to the parking brake mechanism. In this instance, the console box is provided with an opening through which the cable adjusting mechanism is accessible, or the console box is removably mounted. In either case, the adjusting mechanism may be easily manipulated within the passenger compartment.

In accordance with another advantageous form of the invention, the intermediate lever comprises a bell crank lever having two arms, one of which is connected to the first brake cable and the other of which is connected to the second brake cable.

According to a further preferred aspect of the invention, the intermediate-lever device comprises means for guiding the second brake cable across or through the thickness of the floor panel. This guiding means may comprise a pulley rotatably supported by the bracket such that a lower segment thereof is projected away from a lower surface of the floor panel.

BRIEF DESCRIPTION OF THE DRAWING

The above and other objects, features and advantages of the present invention will become more apparent from reading the following description of the preferred embodiment taken in connection with the accompanying drawing in which:

FIG. 3 is a plan view of the intermediate-lever device of FIG. 2.

DETAILED DESCRIPTION OF THE PREFERRED EMBODIMENT

Figure 1:
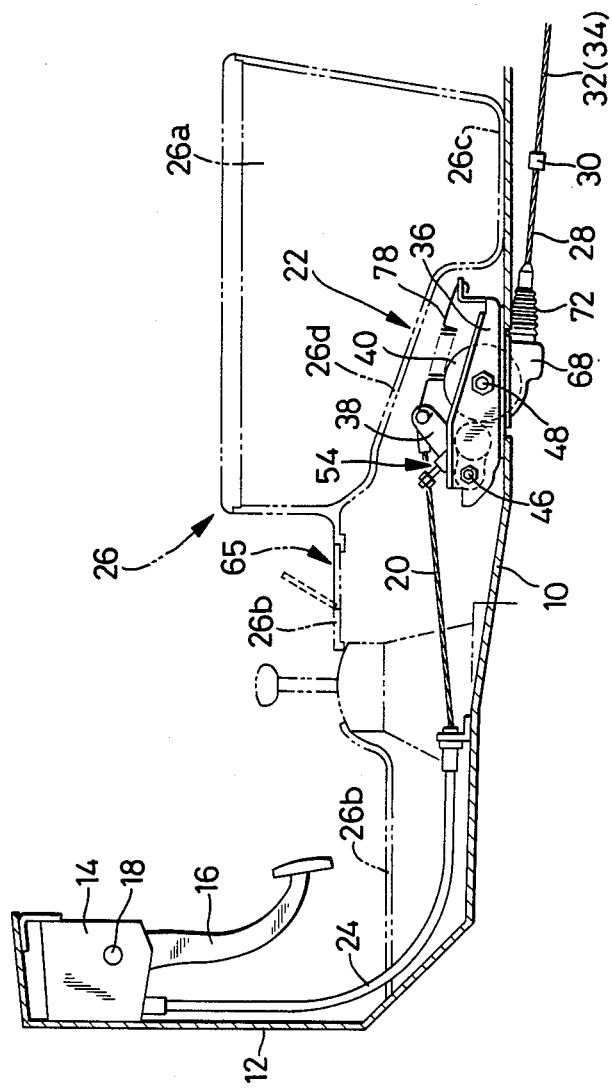
FIG. 1 is a fragmentary elevational view of a parking brake system including a preferred embodiment of an intermediate-lever device of the invention.

Referring to the accompanying drawing, there are shown in FIG. 1 a floor panel 10 and a front panel 12 of a front-engine/front-drive automotive vehicle. On the front panel 12 is secured a bracket 14 which supports a parking brake pedal lever 16 pivotally at a point adjacent one end thereof about a shaft 18. A parking brake cable 20 is connected at its one end to said one end of the pedal lever 16, and at the other end to an intermediate-lever device indicated generally at 22. The parking brake cable 20 is routed to the intermediate-lever device 22 substantially along the front and floor panels 12, 10, and a curved portion of the cable 20 on the side of the bracket 14 is covered with an outer guide tube 24 which is fixed at its opposite ends to the bracket 14 and the floor panel 10, respectively. The bracket 14 is equipped with a lock mechanism (not shown) for locking the pedal lever 16 in its operated or depressed position at which a parking brake is applied, and further equipped with a release mechanism (not shown) for releasing the pedal lever 16 from its operated position, i.e., for allowing the pedal lever 16 to return to its non-operated position at which the brake is released. Since these lock and release mechanisms are not directly associated with the principle of the present invention, no further description thereof will be provided in this specification.

The intermediate-lever device 22, which will be described in detail, is secured to the upper surface of the floor panel 10, that is, secured to the surface of the panel 10 on the side of a passenger compartment in which right and left front seats are disposed. Further, the intermediate-lever device 22 is accommodated in a console box 26 disposed between the right and left front seats. Described more specifically, the console box 26 comprises a container portion 26a located generally above the intermediate-lever device 22, and a cover portion 26b extending from the front of the container portion 26a towards the front panel 12, generally in parallel to the floor panel 10. The container portion 26a has a bottom wall which consists of a flat section 26c resting on the floor panel 10, and a raised section 26d extending over the intermediate-lever device 22. The raised section 26d cooperates with the cover portion 26b and the floor panel 10 to define a space for receiving the intermediate-lever device 22. This space is thus separated by the raised section 26d of the bottom wall from a space defined by the container portion 26a.

A part of the intermediate-lever device 22 protrudes downwardly through an opening formed in the floor panel 10. As stated later in more detail, the intermediate-lever device 22 carries one end of a brake cable 28 which extends via the above-indicated downwardly protruding part towards an equalizer 30 located below the floor panel 10. The brake cable 28 is connected at the other end to a pair of parking brake cables 32 and 34 which are connected to parking brake mechanisms provided on right and left rear wheels of the vehicle, respectively.

Figure 2:
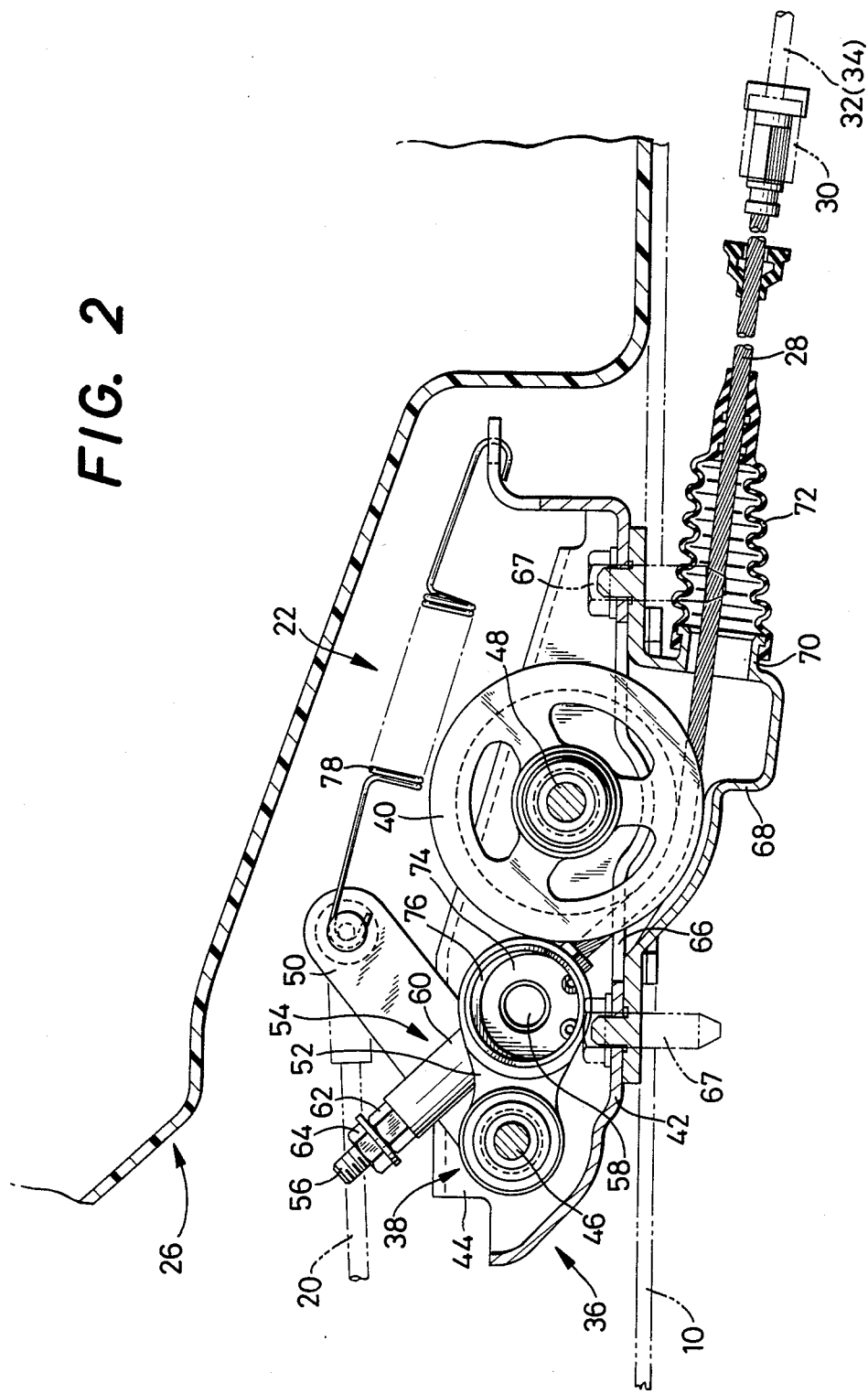
FIG. 2 is an enlarged elevational view of the intermediate-lever device of FIG. 1.

Th intermediate-lever device 22 is depicted in enlargement in FIGS. 2 and 3. As clearly shown in these figures, the intermediate-lever device 22 is an assembly mounted on a bracket 36 and including an intermediate lever 38, a pulley 40 and other components. The bracket 36 is of generally shallow box construction having a bottom portion 42 and a side wall portion 44. The bracket 36 is fixed at its bottom portion 42 to the upper surface of the floor panel 10. As illustrated in FIG. 3, the side wall portion 44 comprises two opposite longer side walls which carry, at their front parallel sections 44a, a bolt 46 for supporting the intermediate lever 38 pivotally about its axis. Central portions of the longer side walls are curved towards each other from the front parallel sections 44a to provide curved sections 44b which carry a bolt 48 for supporting the pulley 40 rotatably about its axis.

The intermediate lever is provided in the form of a bell crank lever having two arms 50 and 52. The previously indicated cable 20 (first brake cable) is fixed to the arm 50, and the cable 28 (second brake cable) is fixed to the other arm 52 via a cable adjusting mechanism 54. This adjusting mechanism 54 includes: an externally threaded screw 56 one end of which is connected to the cable 28; a shaft member 58 which is rotatably supported by the arm 52 and has a hole formed radially through an axially central portion thereof to accommodate the end portion of the screw 56; a sleeve 60 engaging a portion of the screw 56 extending out of the hole in the shaft member 58; and two tension adjusting nuts 62 and 64 threaded on the other end portion of the screw 56 exposed out of the sleeve 60. The arm 52 has a bifurcated portion including two opposite spaced-apart support portions 52a, 52b having holes which receive small-diameter opposite ends of the shaft member 58. The hole 74a formed through the support portion 52b is larger in diameter than the diameter of the shaft member 58, so that the shaft member may be installed through the hole 74a. A collar 74 is received in the hole 74a in the support portion 52b to engage and thereby support the small-diameter end 58a of the shaft member 58. The collar 74 is held in place by a C-shaped retainer ring 76, whereby the shaft member 58 is rotatably supported in place in the bifurcated portion of the arm 52. The nut 62 seats on the end face of the sleeve 60 which in turn rests on the outer periphery of the shaft member 58, whereby a change in position of the nut 62 relative to the sleeve 60 through relative rotation of the nut 62 will permit adjustment of a tension of the cable 28. To provide an access to the adjusting nuts 62, 64, the console box 26 is provided with an opening 65.

The bottom portion 42 of the bracket 36 has a slot 66 through which is downwardly projected a lower segment of the pulley 40. The cable 28 is held in engagement with a groove of the pulley 40, so that the cable 28 is guided and oriented from under the bottom portion 42 towards the end of the screw 56 above the bottom portion 42. While the bracket 36 is secured to the upper surface of the floor panel 10, the lower segment of the pulley 40 projecting through the opening 66 protrudes downwardly from the floor panel 10 through a cutout formed in the panel 10. To protect the pulley 40 against exposure to mud and other foreign matter and to prevent entry of foreign matter into the passenger compartment through the above cutout and the opening 66, there is provided a dust cover 68 having a cable inlet 70 through which the cable 28 extends towards the intermediate lever 38. The bottom portion 42 of the bracket 36 and the dust cover 68 are fixed together to the floor panel 10 with bolts 67 extending through the floor panel 10, dust cover 68 and bottom portion 42, and with nuts (not shown). Further, a portion of the cable 28 outside the dust cover 68 is enclosed by a dust boot 72 made of rubber which is fixed to a portion of the dust cover 68 defining the cable inlet 70. Reference numeral 78 designates a return spring.

The present embodiment of the intermediate-lever device 22 with the foregoing arrangement is pre-assembled on the bracket 36, and the assembly fixed on the bracket 36 is fixed as a unit to the floor panel 10. Therefore, the device 22 may be readily installed on the vehicle.

As indicated previously, almost all essential components of the intermediate-lever device 22 are located above the floor panel 10. That is, only a portion of the pulley 40 is disposed below the floor panel 10, but protected by the dust cover 68 and the dust boot 72. Thus, the intermediate-lever device 22 is protected against otherwise possible exposure to muddy water and other foreign substances, whereby the device 22 may be operated in the intended manner smoothly and reliably for a longer period of time, i.e., the provisions are made for improved durability of the intermediate-lever device 22.

As the whole assembly of the intermediate-lever device 22 is housed in the console box 26 or disposed below its container portion 26a, the device 22 is protected from dust and dirt in the passenger compartment, and will not impair the interior appearance of the passenger compartment. Although the device 22 is accommodated in the console box 26, it occupies only a front portion of a lower space of the box 26, whereby a substantive portion of the space of the box 26 may be utilized for its intended or other desired purposes.

As a further advantage of the present embodiment, the cable adjusting mechanism 54 may be accessed through the opening 65. This arrangement makes it easier to adjust the tension of the cable 28, than to make a cable tension adjustment by a cable tension adjusting mechanism of a traditional intermediate-lever device which is located under a floor panel of a vehicle.

While the present invention has been described in its preferred form for illustrative purposes only, it is to be understood that the invention is not limited thereto; but various changes and modifications may be made by those skilled in the art, for example, in connection with the specific structures of the bracket, intermediate lever, cable adjusting mechanism, and the other components. Although the pulley 40 used in the preferred embodiment as a means for guiding the cable 28 across or through the thickness of the floor panel 10 is effective for protecting the cable 28 against wear due to friction, it is possible that the bracket be formed with an integral cable guide portion. Although an intermediate-lever device according to the invention is particularly useful for a foot-operated type of parking brake system for a front-engine/front-drive vehicle, the invention is usable for a parking brake system of a front-engine/rear-drive vehicle, or for a parking brake system equipped with a hand-operated control lever. Further, it is to be appreciated that a console box between the front seats could be adapted to be removable to obtain access to the cable adjusting mechanism, rather than the console box being provided with an opening through which the adjusting mechanism is accessible for cable adjustment.

It will be apparent that other changes and modifications may be made within the scope of the invention defined in the appended claims.

What is claimed is:

1. An intermediate-lever device for a parking brake system in a vehicle which has a console box disposed between right and left seats thereof associated with an upper surface of a floor panel thereof, the parking brake system including a parking brake control member, a parking brake mechanism, a first brake cable connected at one end to the control member, and a second brake cable connected at one end thereof to the parking brake mechanism, said intermediate-lever device comprising:

an intermediate lever connecting the other end of said first brake cable to the other end of said second brake cable; and a bracket pivotably supporting said intermediate lever, said intermediate lever and said bracket being accommodated in said console box, said bracket being secured to said upper surface of said floor panel of the vehicle.

2. An intermediate-lever device as set forth in claim 1, further comprising means for guiding said second brake cable through a thickness of said floor plate.

3. An intermediate-lever device as set forth in claim 2, wherein said guiding means comprises a pulley rotatably supported by said bracket such that a lower segment thereof is projected away from a lower surface of said floor panel opposite to said upper surface thereof.

4. An intermediate-lever device as set forth in claim 3, further comprising a dust cover fixed to said floor panel and covering said lower segment of said pulley.

5. An intermediate-lever device as set forth in claim 4, further comprising a dust boot and wherein said dust cover has a cable inlet through which said second brake cable extends towards said intermediate lever, said dust boot enclosing a portion of said second brake cable outside said dust cover.

6. An intermediate-lever device as set forth in claim 1, wherein said intermediate lever comprises a bell crank lever having two arms, one of said two arms being connected to said first brake cable, and the other arm being connected to said second cable.

7. An intermediate-lever device as set froth in claim 1 further comprising a cable adjusting mechanism disposed between said intermediate lever and said second brake cable to adjust a tension of said second brake cable, said cable adjusting mechanism being disposed above said upper surface of the floor panel.

8. An intermediate-lever device as set forth in claim 7, wherein said intermediate lever comprises a bell crank lever having two arms, one of said two arms being connected to said first brake cable, and the other arm being connected to said second cable.

9. An intermediate-lever device as set forth in claim 8, wherein said cable adjusting mechanism includes: a shaft member rotatably supported by said other arm of the bell crank lever and having a hole formed radially through an axially central portion thereof; an externally threaded screw inserted through said hole in said shaft member and connected at one end thereof to said other end of the second brake cable; and a nut threaded to the other end of said screw.

10. An intermediate-lever device as set forth in claim 9, wherein said other arm has a bifurcated portion including two opposite spaced-apart support portions, said shaft member being rotatably supported at opposite ends thereof by said support portions of said other arm, one of said support portions having a through-hole with a diameter larger than a diameter of said shaft member.

11. An intermediate-lever device as set forth in claim 10, wherein said cable adjusting mechanism further comprises a collar received in said through-hole and engaging one of said opposite ends of said shaft member on the side of said one support portion of said other arm.

12. An intermediate-lever device as set forth in claim 7, wherein said console box has an opening through which said cable adjusting mechanism is accessible.

13. An intermediate-lever device as set forth in claim 7, wherein said console box is removably fixed to said floor panel.

14. An intermediate-lever device as set forth in claim 1, wherein said console box comprises a container portion located generally above said intermediate lever and having a bottom wall, and further comprises a cover portion cooperating with said bottom wall and said floor panel to define a space for receiving said intermediate-lever device.

15. An intermediate-lever device as set forth in claim 14, wherein said bottom wall of the container portion of the console box comprises a flat section resting on said floor plate, and a raised section extending over said intermediate-lever device so as to separate a space in said container portion from said space for receiving said intermediate-lever device.

16. An intermediate-lever device as set forth in claim 1, further comprising a pulley rotatably supported by said bracket such that a lower segment thereof is projected away from a lower surface of said floor panel opposite to said upper surface thereof, said pulley guiding said second brake cable through a thickness of said floor panel.

17. An intermediate-lever device as set forth in claim 16, wherein said bracket is of generally shallow box construction having a bottom portion fixed to said upper surface of the floor panel, and opposite side walls which support said intermediate lever and said pulley.

18. An intermediate-lever device as set forth in claim 17, wherein said opposite side walls comprise front parallel sections by which said intermediate lever is pivotably supported, and further comprise central curved sections which are curved towards each other from said parallel sections, said pulley being rotatably supported by said central curved sections of said opposite side walls.

19. An intermediate-lever device as set forth in claim 1, wherein said parking brake control member comprises a foot-operated pedal lever.

* * * * *